(12) United States Patent
Kojima et al.

(10) Patent No.: US 6,542,793 B2
(45) Date of Patent: Apr. 1, 2003

(54) PEDAL APPARATUS FOR VEHICLES AND A VEHICLE EQUIPPED WITH THE SAME

(75) Inventors: Takao Kojima, Hitachi (JP); Kazuhiko Satou, Mito (JP); Toshimichi Minowa, Mito (JP); Satoru Kuragaki, Hitachi (JP); Tokuji Yoshikawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/960,491

(22) Filed: Sep. 24, 2001

(65) Prior Publication Data

US 2002/0161487 A1 Oct. 31, 2002

(30) Foreign Application Priority Data

Apr. 25, 2001 (JP) ........................................ 2001-127047

(51) Int. Cl.[7] .............................. G06F 7/00; G06F 17/00
(52) U.S. Cl. .............................. 701/1; 701/70; 701/78; 701/79; 701/93; 303/116.1; 303/113.1; 303/113.5; 303/122.09; 60/554; 60/547.1; 180/170; 180/176; 180/177; 180/274; 180/275; 74/512; 74/513
(58) Field of Search ............................... 701/1, 70, 78, 701/93, 79; 303/116.1, 113.1, 113.5, 113.2, 113.4, 122.09; 60/554, 547.1; 180/170, 176, 177, 274, 275; 74/512, 513

(56) References Cited

U.S. PATENT DOCUMENTS

| | | | | |
|---|---|---|---|---|
| 5,333,944 A | * | 8/1994 | Shirai et al. ............. | 303/113.4 |
| 5,927,419 A | | 7/1999 | Tokimoto | |
| 6,024,420 A | * | 2/2000 | Yonemura et al. ....... | 303/113.2 |
| 6,050,653 A | * | 4/2000 | Wachi et aL. ........... | 303/113.4 |
| 6,142,581 A | * | 11/2000 | Yamaguchi et al. ..... | 303/113.2 |
| 6,158,824 A | * | 12/2000 | Yonemura et al. ....... | 303/113.4 |
| 6,253,635 B1 | * | 7/2001 | Huber ........................ | 267/158 |
| 2001/0038243 A1 | * | 11/2001 | Isono ...................... | 303/116.1 |

FOREIGN PATENT DOCUMENTS

| | | |
|---|---|---|
| JP | 9-123883 | 5/1997 |
| JP | 2000-54860 | 2/2000 |

OTHER PUBLICATIONS

U.S. patent application Ser. No. 09/824,720.
U.S. patent application Ser. No. 09/922,917.

* cited by examiner

*Primary Examiner*—William A. Cuchlinski, Jr.
*Assistant Examiner*—Ronnie Mancho

(57) ABSTRACT

There is provided a pedal apparatus for vehicles, which comprises a pedal reaction-force addition means 4 for adding a reaction force to a pedal 1 of a vehicle, a pedal force detection means 2 for detecting a force added to the pedal 1, a pedal reaction-force control means 3 for adjusting the output of the pedal reaction-force addition means 4. During the running of the vehicle, the pedal reaction-force control means 3 performs the adjustment of a reaction force of the pedal on the basis of the driving environment of the vehicle and the driver's intention and judgement in pedal operation in the driving environment, whereby it is ensured that when the driver has no intention of operating the pedal, the driver can sufficiently place his or her foot on the pedal and that when he driver has any intention of operating the pedal, the driver can realize a smooth pedal operation.

8 Claims, 16 Drawing Sheets

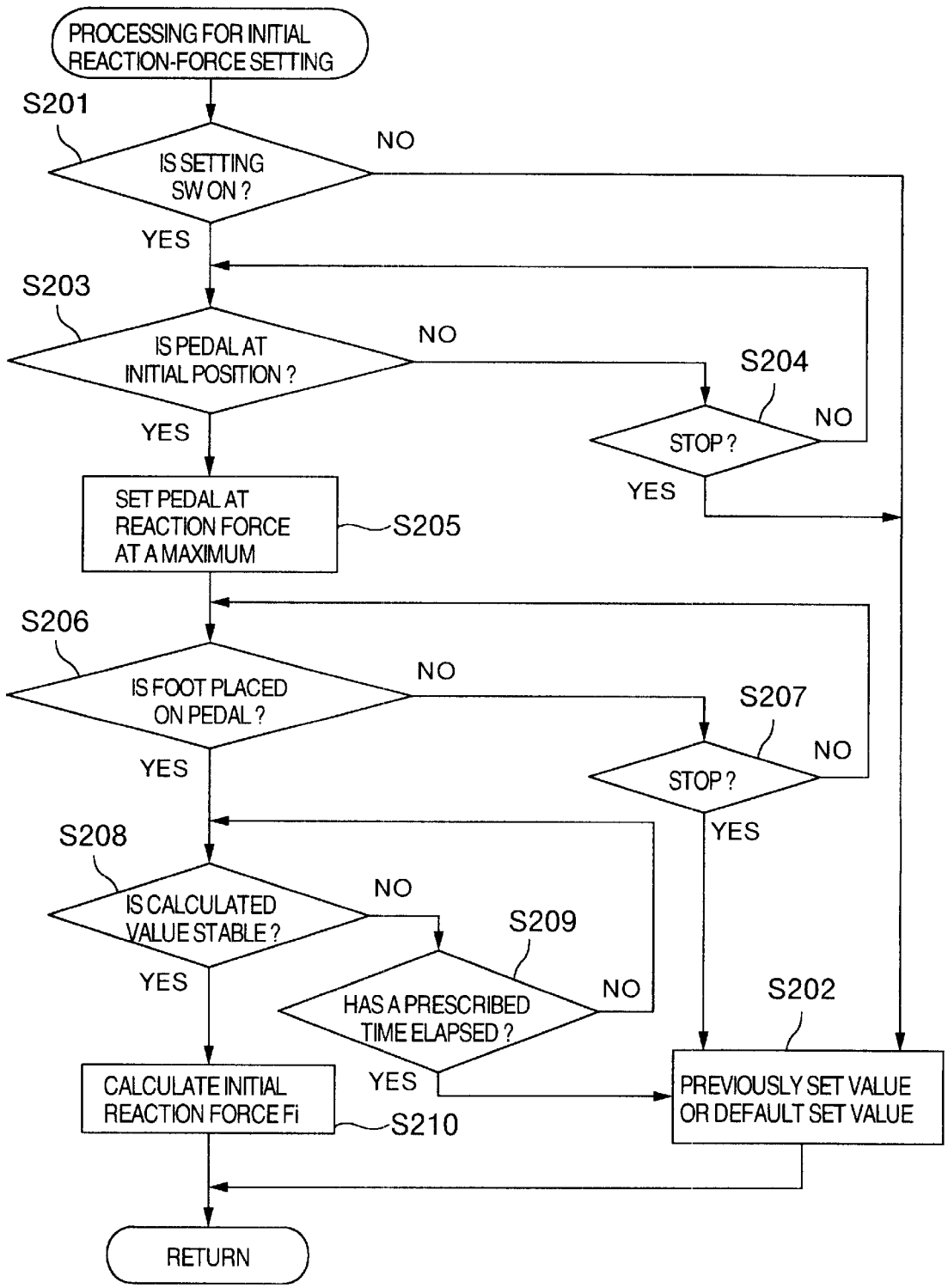

FIG.4A PROCESSING FOR SETTING
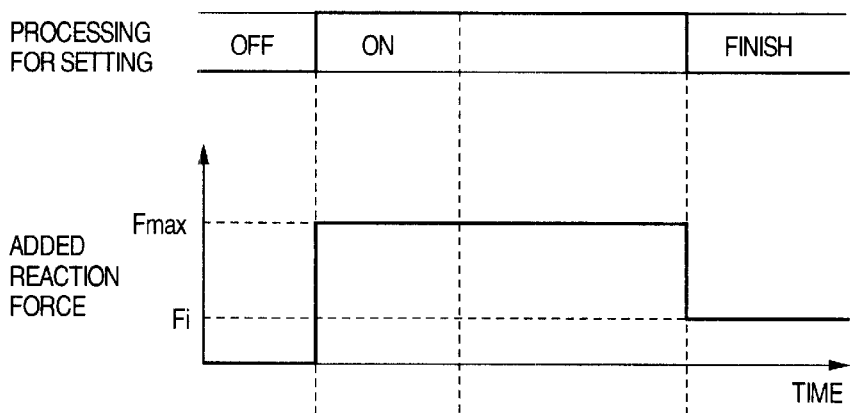
FIG.4B ADDED REACTION FORCE
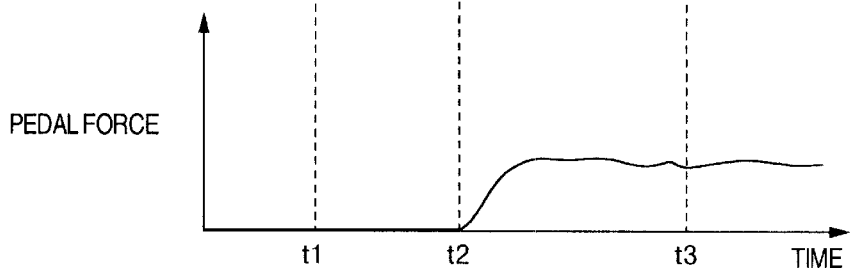
FIG.4C PEDAL FORCE FIG.7
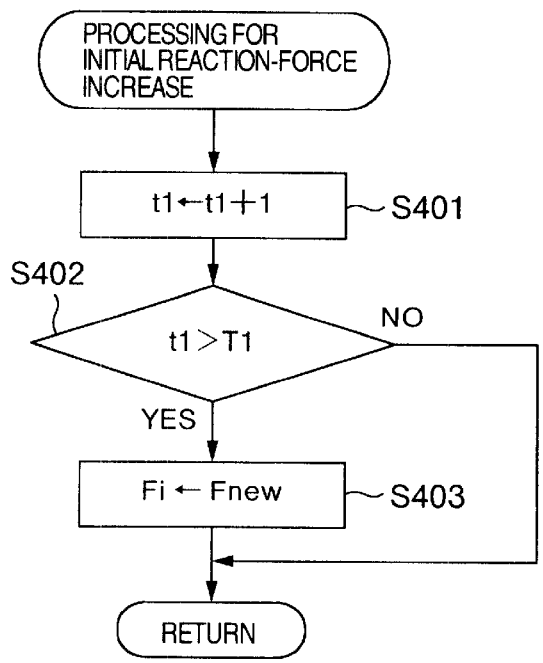
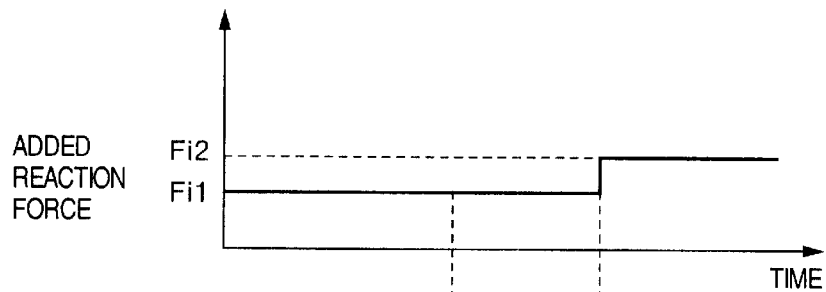
FIG.8A
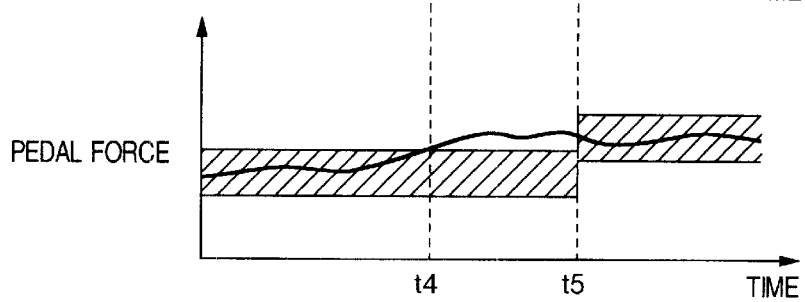
FIG.8B

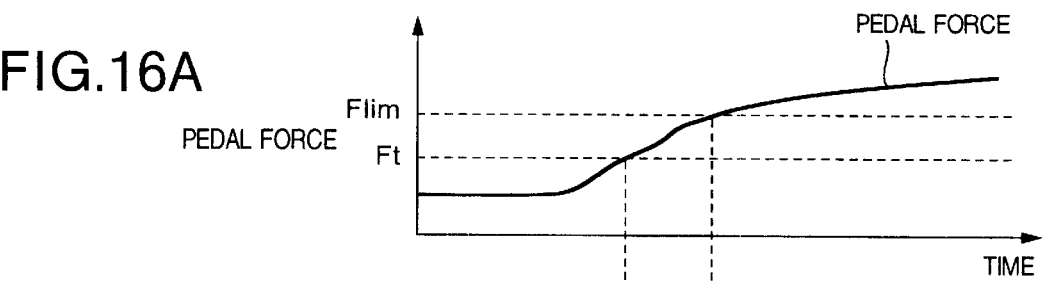
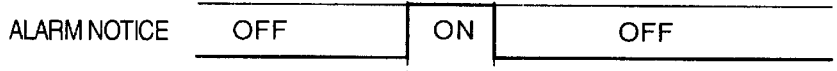
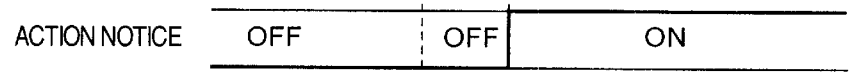
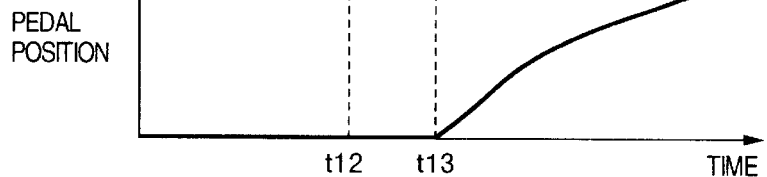
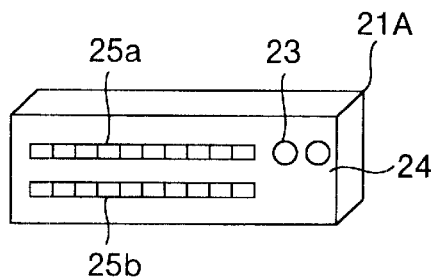
FIG.17

PEDAL FORCE 27 REACTION FORCE

PEDAL FORCE 28 REACTION FORCE

PEDAL APPARATUS FOR VEHICLES AND A VEHICLE EQUIPPED WITH THE SAME

BACKGROUND OF THE INVENTION

The present invention relates to a pedal apparatus for vehicles and a vehicle equipped with the pedal apparatus and, more particularly, to a pedal apparatus suitable for use in vehicles equipped with a pedal reaction-force addition means capable of being used in an automatic running control apparatus for vehicles and a vehicle equipped with the pedal apparatus.

Some known recent vehicles are equipped with what is called an automatic running control apparatus, such as a cruise control apparatus for keeping the speed of a vehicle not by the pedal operation by a driver and an adaptive cruise control apparatus for keeping an appropriate distance between one's vehicle and the vehicle in front. Because in such an automatic running control apparatus, the driver suspends the operation of the automatic running control apparatus by operating a pedal, there is a known pedal apparatus for vehicles which enables a brake pedal or an accelerator pedal to be used as a place where the driver can place his or her foot during the operation of the automatic running control apparatus.

For example as described in JP-A-9-123883, there is a known pedal apparatus for vehicles, in which even when the driver's foot is kept placed on the pedal apparatus during the operation of an automatic running control apparatus, it is ensured by the control of the hydraulic pressure of a brake that a wheel brake does not work when a pedal force is below a prescribed value and that the wheel brake works when the pedal force is not less than the prescribed value. Furthermore, as described in JP-A-2000-54860, there is another known pedal apparatus for vehicles, in which during the operation of an automatic running control apparatus, it is ensured, through the use of a reaction-force adjustment means for adding a prescribed reaction force to an accelerator pedal or a brake pedal, that a condition in which the pedal is not depressed beyond a prescribed pedal-holding position during pedal depressing is kept when the driver's foot is simply placed on the pedal.

However, in the pedal apparatuses for vehicles described in JP-A-9-123883 and JP-A-2000-54860, a reaction force added to the pedal during the operation of a vehicle is constant and, therefore, the reaction force is not always appropriate for the driver in various driving environments. In such cases, it is necessary for the driver to strongly depress the pedal by putting force in the leg in pedal operation or, conversely, to keep a standby condition in which the motion of the foot is stopped immediately before the depressing of the pedal because the foot cannot be sufficiently placed on the pedal, posing a first problem that the fatigue of the driver's foot increases.

Furthermore, even when the driver can obtain a reaction force high enough to simply place his or her foot on the pedal, the driver cannot easily judge to what extent the pedal force can be held and it is necessary for the driver to pay attention to the possibility that the pedal may be depressed, posing a second problem that the driver's fatigue increases also psychologically.

SUMMARY OF THE INVENTION

Therefore, the first object of the present invention is to provide a pedal apparatus for vehicles which can add an appropriate reaction force to a pedal and a vehicle equipped with the pedal apparatus.

The second object of the present invention is to provide a pedal apparatus for vehicles which does not put a burden on a driver and which is friendly to the driver and a vehicle equipped with the pedal apparatus.

(1) In the present invention, to achieve the first object, there is provided a pedal apparatus for vehicles which comprises: a pedal reaction-force addition means for adding a reaction force to a pedal of a vehicle; a pedal force detection means for detecting a force added to the pedal; and a pedal reaction-force control means for adjusting the output of the pedal reaction-force addition means. The pedal reaction-force control means adjusts the output of the pedal reaction-force addition means according to the output of the pedal force detection means.

With this arrangement, it enables an appropriate reaction force to be added to the pedal.

(2) In the above item (1), preferably, in a case where a prescribed time elapses with the output ratio of the pedal reaction-force addition means to the pedal force detection means kept out of a prescribed range, the output of the pedal reaction-force addition means is changed.

(3) In the above item (1), preferably, in a case where the output of the pedal force detection means increases and the amount of increase in the output becomes not less than a prescribed threshold value, the output of the pedal reaction-force addition means is changed.

(4) In the present invention, to achieve the second object, there is provided a pedal apparatus for vehicles which comprises: a pedal reaction-force addition means for adding a reaction force to a pedal of a vehicle; a pedal force detection means for detecting a force added to the pedal; and a status information notice means for giving a notice of the status of the force added to the pedal.

With this arrangement, the pedal apparatus for vehicles does not put a burden on a driver and is friendly to the driver.

(5) In the above item (4), preferably, the status information means gives a notice of the output ratio of the pedal reaction-force addition means to the pedal force detection means.

(6) In the item (4) above, preferably, in a case where the output of the pedal force detection means exceeds a prescribed threshold value, the status information means gives a notice of the fact that the output of the pedal force detection means exceeded a prescribed threshold value.

(7) In the present invention, to achieve the first object, there is provided a vehicle which is equipped with a pedal apparatus for vehicles which comprises: a pedal reaction-force addition means for adding a reaction force to a pedal of a vehicle; a pedal force detection means for detecting a force added to the pedal; and a pedal reaction-force control means for adjusting the output of the pedal reaction-force addition means. The pedal reaction-force control means adjusts the output of the pedal reaction-force addition means according to the output of the pedal force detection means.

With this arrangement, it enables an appropriate reaction force to be added to the pedal.

(8) In the present invention, to achieve the second object, there is provided a vehicle which is equipped with a pedal apparatus for vehicles which comprises: a pedal reaction-force addition means for adding a reaction force to a pedal of a vehicle; a pedal force detection means for detecting a force added to the pedal; and a status information means for giving a notice of the status of the force added to the pedal.

BRIEF DESCRIPTION OF THE DRAWINGS

FIG. 3 is a flow chart which shows the content of the processing for setting an initial reaction force by the pedal reaction-force addition means according to the first embodiment of the present invention;

FIGS. 4A to 4C are time charts which show the content of the processing for setting an initial reaction force by the pedal reaction-force addition means according to the first embodiment of the present invention;

FIG. 7 is a flow chart which shows the content of the processing for adjusting a reaction force by the pedal reaction-force addition means according to the first embodiment of the present invention;

FIGS. 8A and 8B are time charts which show the content of processing for adjusting a reaction force by the pedal reaction-force addition means according to the first embodiment of the present invention;

FIGS. 16A to 16D are time charts which show a display method of the pedal-pedal-status information device according to the fourth embodiment of the present invention;

FIG. 17 is an explanatory diagram which shows a further example of display means used in the pedal-pedal-status information device according to the fourth embodiment of the present invention;

DETAILED DESCRIPTION OF PREFERRED EMBODIMENTS OF THE INVENTION

The arrangement and operation of a pedal apparatus for vehicles according to a first embodiment of the present invention are described below by referring to FIG. 1 to FIGS. 10A and 10B.

Figure 1:
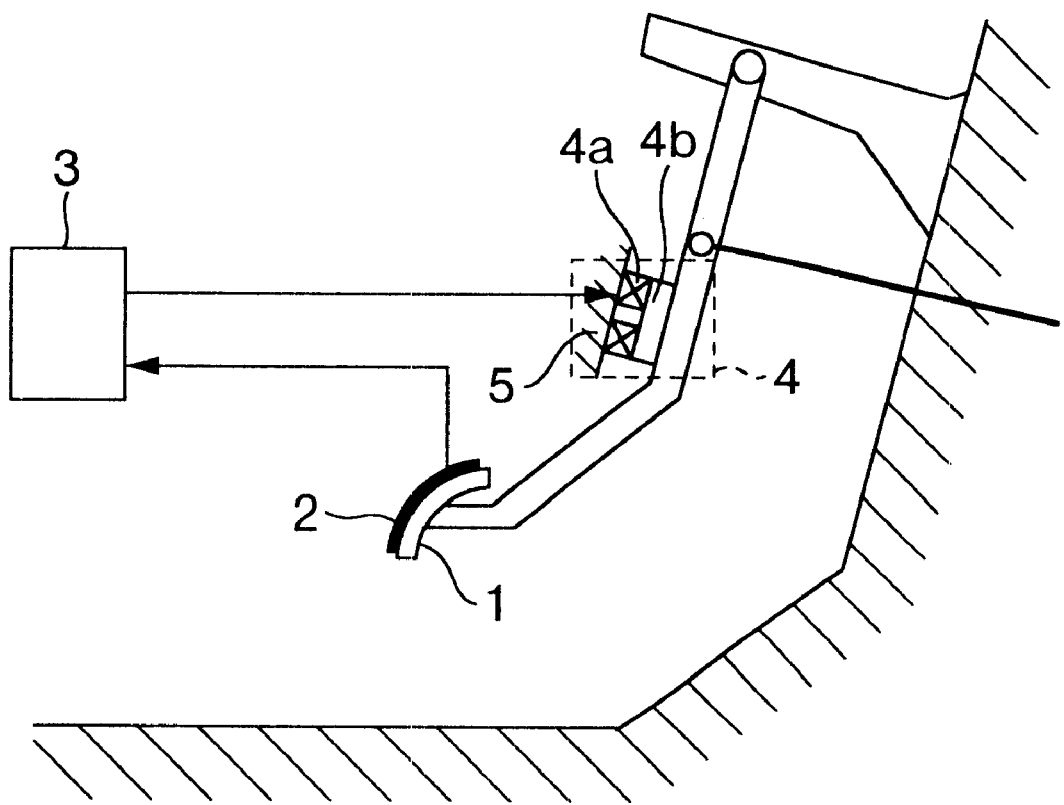
FIG. 1 is a block diagram which shows the arrangement of a pedal apparatus for vehicles comprising a pedal reaction-force addition device according to a first embodiment of the present invention.

First, the arrangement of a pedal apparatus for vehicles according to this embodiment is described by referring to FIG. 1.

FIG. 1 is a block diagram which shows the arrangement of a pedal apparatus for vehicles comprising a pedal reaction-force addition device according to the first embodiment of the present invention.

The pedal reaction-force application device comprises a pedal 1, a pedal force detection means 2, a pedal reaction-force control means 3, and a pedal reaction-force addition means 4. The pedal 1 may be either a brake pedal or an accelerator pedal. The pedal force detection means 2 is a sensor for detecting a force added to the pedal 1. The pedal reaction-force control means 3 controls a reaction force added to the pedal 1 to an appropriate value by controlling the pedal reaction-force addition means 4. The details of the content of the control will be described later by referring to FIG. 2.

The pedal reaction-force addition means 4 gives a reaction force to the pedal 1 by use of an electromagnet (solenoid) and comprises a stator 4a and a movable element 4b. The stator 4a is fixed at its end to a vehicle body 5. The movable element 4b is fixed to an arm of the pedal 1. The pedal reaction-force control means 3 realizes the reaction-force adjustment of the pedal 1 by changing the quantity of electricity to the stator 4a of pedal reaction-force addition means 4, thereby changing a suction force between the stator 4a and the movable element 4b.

Next, the operation of the pedal reaction-force control means according to this embodiment is described by referring to FIG. 2 to FIGS. 10A and 10B.

Figure 2:
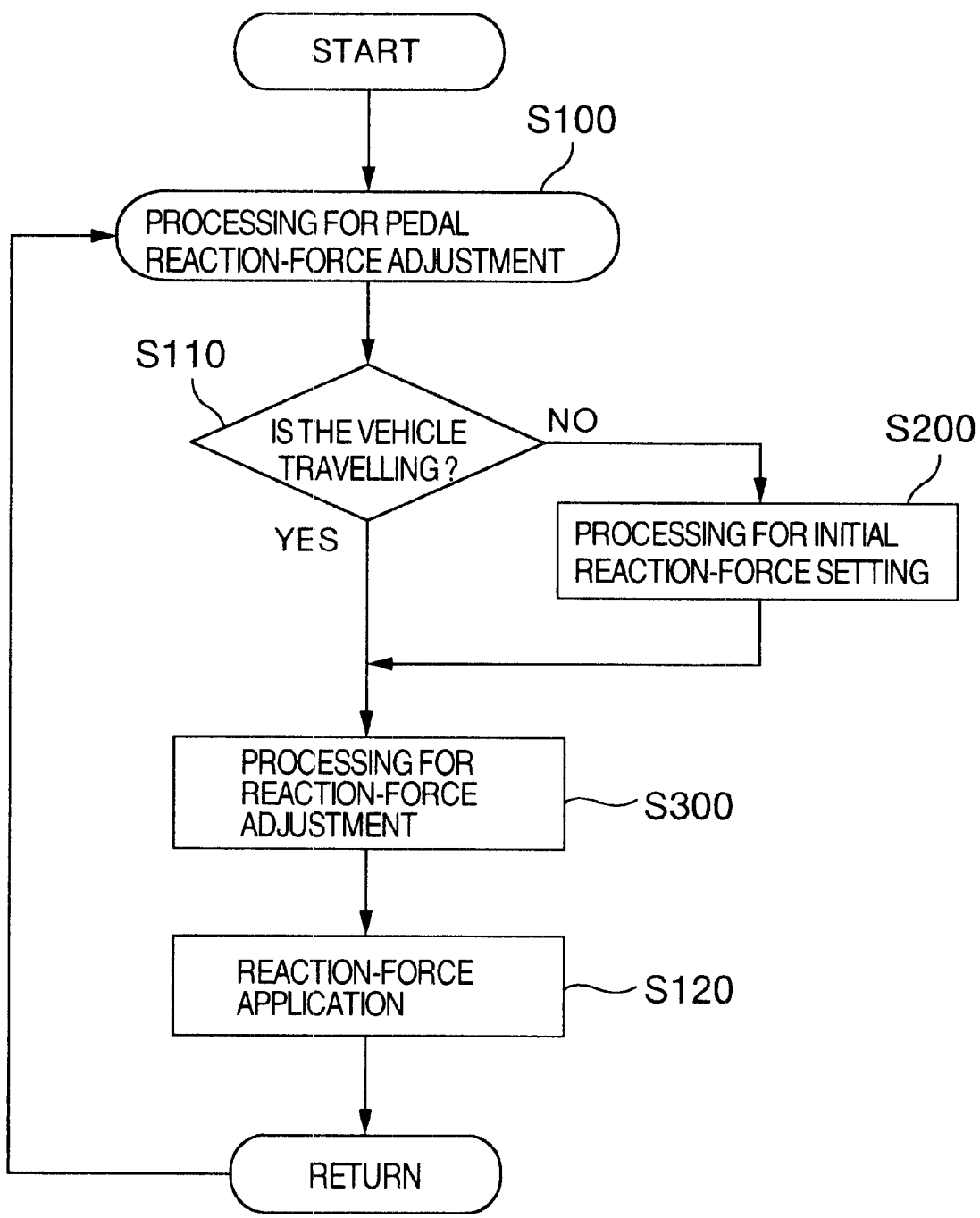
FIG. 2 is a flow chart which shows the content of the control by the pedal reaction-force addition means according to the first embodiment of the present invention.

First, the over-all content of the control by the pedal reaction-force control means according to this embodiment is described by referring to FIG. 2.

FIG. 2 is a flow chart which shows the content of the control by the pedal reaction-force addition means according to the first embodiment of the present invention.

At the step S100, the pedal reaction-force control means 3 starts the processing for adjusting a pedal reaction-force.

Next, at the step S110, the pedal reaction-force control means 3 judges whether or not the vehicle is running. The step S110 proceeds to the step S200 when the vehicle is at a standstill. The step S110 proceeds to the step S300 when the vehicle is running. In the case of a vehicle equipped with an automatic transmission (an AT vehicle), a judgment is passed as to whether the vehicle is running, for example, by considering whether or not the shift position is the "P" (parking) position. Furthermore, safety may be ensured by ascertaining whether or not the vehicle speed is "0 km/h" or whether or not a parking brake is working instead of checking the shift position, for example. By adopting these judgment methods, the pedal reaction-force control means 3 can be added to a manual transmission vehicle (an MT vehicle).

In a case where the vehicle is at a standstill, at the step S200 the pedal reaction-force control means 3 performs the processing for setting an initial reaction force. The details of the content of processing for setting an initial reaction force are described by referring to FIG. 3 and FIGS. 4A to 4C. In the processing for setting an initial reaction force, an initial value of a reaction force added to the pedal by the reaction-force addition means 4 is automatically adjusted to the driver. Therefore, an appropriate pedal reaction force can be added irrespective of personal differences among drivers.

Because in this embodiment, a reaction force added to the pedal can be set only when the vehicle is at a complete standstill, it is possible to ensure the safety of occupants including the driver. Incidentally, when an initial reaction force is set during the running of the vehicle, there is a possibility that the reaction force of the pedal 1 may change during running or the driver may not perform a safe operation because the driver concentrates his or her awareness on setting. In this embodiment, however, the driver can ensure the safety of occupants in spite of this possibility.

Furthermore, while the vehicle is running or when the processing at the step S200 is completed, at the step S300 the pedal reaction-force control means 3 performs the processing for adjusting the reaction force of the pedal 1 on the basis of the driving environment of the vehicle or the driver's intention and judgment in pedal operation. The details of the content of processing for adjusting a reaction force will be described later by referring to FIG. 5 to FIGS. 10A and 10B. In the processing for adjusting a reaction force, by performing the adjustment of the reaction force of the pedal 1 on the basis of the driving environment of the vehicle or the driver's intention and judgment in pedal operation, it is ensured that when the driver has no intention of operating the pedal 1, the driver can sufficiently place his or her foot on the pedal 1 and that when the driver has any intention of operating the pedal 1, the driver can realize a smooth pedal operation.

Next, at the step S120, the pedal reaction-force control means 3 adds a set reaction force to the pedal 1 by use of the pedal reaction-force addition means 4 and temporarily finishes this processing.

Next, the content of the processing for setting an initial reaction-force by the pedal reaction-force control means according to this embodiment is described by referring to FIG. 3 and FIGS. 4A to 4C.

FIG. 3 is a flow chart which shows the content of the processing for setting an initial reaction force by the pedal reaction-force addition means according to the first embodiment of the present invention. FIGS. 4A to 4C are time charts which show the content of the processing for setting an initial reaction force by the pedal reaction-force addition means according to the first embodiment of the present invention.

In FIGS. 4A to 4C, the horizontal axis represents time. FIG. 4A indicates the condition of the processing for setting, FIG. 4B indicates the magnitude of an added reaction force F, and FIG. 4C indicates the magnitude of a pedal force.

At the step S201 in FIG. 3, the pedal reaction-force control means 3 judges whether or not a setting switch is on. The setting switch is installed, for example, on a dash board of a vehicle and when the driver intends to set an initial reaction force, the driver turns this switch on. When the setting switch is in the on position, the pedal reaction-force control means 3 performs the processing for setting an initial reaction force at the step S203 and succeeding steps. On the other hand, when the setting switch is in the off position, the step S201 proceeds to the step S202, where the pedal reaction-force control means 3 sets a value set last time or a specified value as an initial reaction force Fi without renewedly setting an initial value and temporarily finishes this processing. Therefore, when the driver temporarily leaves the vehicle and starts operation again, it is unnecessary for the driver to set an initial reaction force and hence the driver can save the labor of setting an initial reaction force each time operation is started.

When the processing for setting is to be started, at the step S203, the pedal reaction-force control means 3 judges whether or not the pedal 1 in the initial position. For example, when the pedal 1 is a brake pedal, in a judgment as to whether or not the pedal 1 is in the initial position, it is possible to judge from the output of a brake sensor whether or not the brake is depressed. Furthermore, when the pedal 1 is an accelerator pedal, whether or not the accelerator is depressed can be judged from the output of an accelerator-position sensor. When the pedal 1 is in the initial position, the step S203 proceeds to the step S205. When the pedal 1 is not in the initial position, the step S203 proceeds to the step S204.

In a case where the pedal is in the initial position in the judgment at the step S203, at the step S205 the pedal traction-force control means 3 temporarily sets the pedal reaction force at a maximum value Fmax and makes preparations for measurement for the setting of an initial reaction force. In other words, when at the time t1 in FIGS. 4A to 4C the setting switch is on during the processing for setting as shown in FIG. 4A, the pedal reaction-force control means 3 sets a maximum value Fmax as an added reaction force F as shown in FIG. 4B.

Next, at the step S206, the pedal reaction-force control means 3 judges whether or not the driver has placed his or her foot on the pedal 1. For the judgment as to whether or not the driver's foot has been placed, for example, when the output of the pedal force detection means 2 is larger than 0, the pedal reaction-force control means 3 judges that the driver's foot has been placed on the pedal 1. When it is judged that the driver's foot has been placed, the step S206 proceeds to the step S208. When it is judged that the driver's foot has not been placed, the step S206 proceeds to the step S207. For example, at the time t2 in FIGS. 4A to 4C, the pedal force is larger than 0 as shown-in FIG. 4C and, therefore, it is judged that the driver's foot has been placed.

When it is judged that the driver's foot has been placed, at the step S208 the pedal reaction-force control means 3 judges, on the basis the output of the pedal force detection means 2, whether measured values of pedal force have become stable. In falling a judgment as to whether or not measured values have become stable, the pedal reaction-force control means 3 calculates the dispersion and standard deviation of measured values and judges these values are not more than prescribed values. When it is judged that measured values have become stable, the step S208 proceeds to the step S210. When it is judged that measured values have not become stable, the step S208 proceeds to the step S209.

In a case where measured values have not become stable, at the step S209 the pedal reaction-force control means 3 judges whether or not the time after the start of measurement has exceeded a prescribed value. When it is judged that a prescribed time has been exceeded, the step S209 proceeds to the step S202. On the other hand, when it is judged that a prescribed time has not elapsed, the step S209 returns o the step S208 and the measurement is continued. Therefore, in a case where measured values do not become stable within a prescribed time, at the step S202 a value set last time or a specified value is set as an initial reaction force Fi. In this case, by bringing the setting switch into an on condition, it is possible to perform again the processing for adjusting an initial reaction force at the step S200.

When it is judged in the judgment at the step S208 that a measured value has become stable, at the step S210 the pedal reaction-force control means 3 calculates, on the basis of a measured value of pedal force, an initial reaction force Fi of the pedal 1 necessary to the driver and temporarily finishes this processing. Then, after the processing for adjusting a reaction force at the step S300 in FIG. 2, at the step S120 the pedal reaction-force control means 3 applies an initial reaction force Fi at the time t3 as shown in FIG. 4B.

When at the step S204 or S207 a decision to stop the processing for setting an initial reaction force is made, at the step S202 the pedal reaction-force control means 3 applies a value set last time or a specified value as an initial reaction force Fi. Therefore, the driver can stop the setting any time by bringing the setting switch into an off position.

Therefore, the driver can obtain a pedal reaction force suitable to the driver only by depressing the setting switch and placing his or her foot on the pedal 1. Incidentally, in a case where the setting switch is depressed again during setting or the function of holding the pedal 1 is canceled because the driver has strongly depressed the pedal 1, it is also possible to add the function of resetting or stopping the setting. When the setting is stopped, a specified value is set as an initial reaction force Fi.

Next, the content of the processing for adjusting a reaction force by the pedal reaction-force control means according to this embodiment is described by referring to FIG. 5 to FIGS. 10A and 10B.

Figure 5:
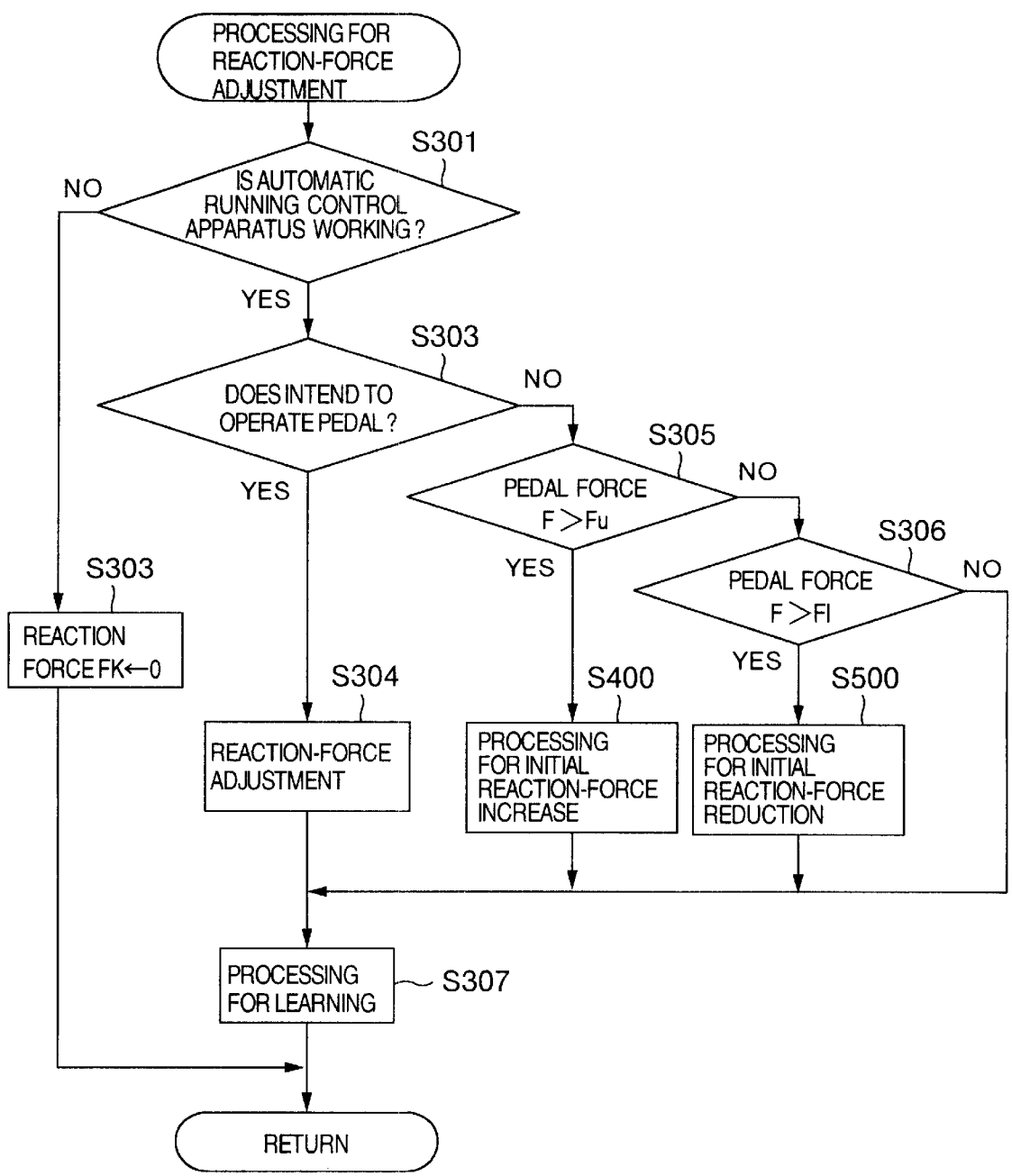
FIG. 5 is a flow chart which shows the content of the processing for adjusting a reaction force by the pedal reaction-force addition means according to the first embodiment of the present invention.
Figure 9:
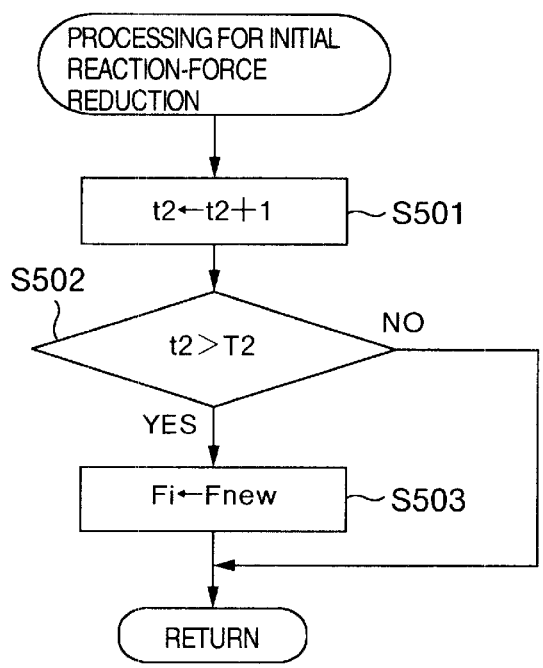
FIG. 9 is a flow chart which show the content of the processing for adjusting a reaction force by the pedal reaction-force addition means according to the first embodiment of the present invention.

FIGS. 5, 7 and 9 are flow charts which show the content of processing for adjusting a reaction force by the pedal reaction-force addition means according to the first embodiment of the present invention. FIGS. 6A to 6D, FIGS. 8A and 8B and FIGS. 10A and 10B are time charts which show the content of the processing for adjusting a reaction force by the pedal reaction-force addition means according to the first embodiment of the present invention.

Figure 6A:
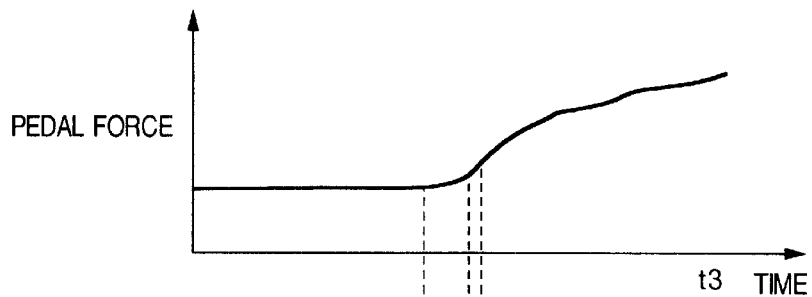
FIGS. 6A to 6D are time charts which-show the content of the processing for adjusting a reaction force by the pedal reaction-force addition means according to the first embodiment of the present invention.
Figure 10A:
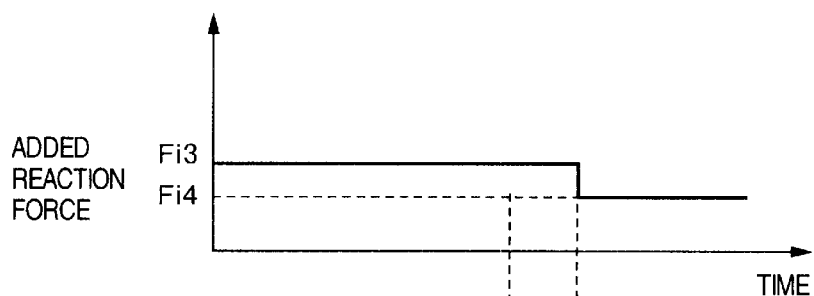
FIGS. 10A and 10B are time charts which show the content of the processing for adjusting a reaction force by the pedal reaction-force addition means according to the first embodiment of the present invention.

In FIGS. 6A to 6D, the horizontal axis represents time. FIG. 6A indicates the magnitude of pedal force, FIG. 6B a change in the amount of pedal force, FIG. 6C the magnitude of an added reaction force, and FIG. 6D the pedal position. In FIGS. 8A and 8B and FIGS. 10A and 10B, the horizontal axis represents time. FIGS. 8A and 10A indicate the magnitude of an added reaction force and FIGS. 8B and 10B indicate the magnitude of pedal force.

At the step S301 in FIG. 5, the pedal reaction-force control means 3 judges whether an automatic running control apparatus is working. Because the vehicle is equipped with a switch for turning on and off the automatic running control apparatus, etc., from the condition of this switch, it is possible to judge whether or not the automatic running control apparatus is working. In a case where the automatic running control apparatus is working, the step S301 proceeds to the step S302. On the other hand, in a case where the automatic running control apparatus is not working, the step S301 proceeds to the step S303 and the pedal reaction-force control means 3 sets 0 as a pedal reaction force FK, with the result that the pedal reaction-force addition means does not work.

In a case where the automatic running control apparatus is working, at the step S302 the pedal reaction-force control means 3 judges whether or not the driver has any intention of operating the pedal 1. When it is judged that the driver has the intention, the step S302 proceeds to the step S304. When it is judged that the driver has no intention, the step S302 proceeds to the step S305.

Figure 6B:
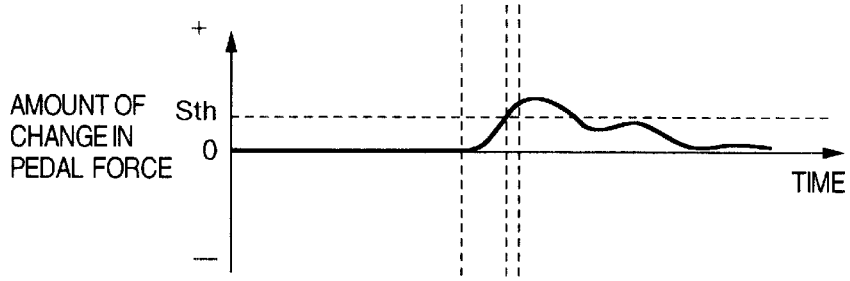

Then, a method of judging whether or not the driver has any intention of operating the pedal 1 is described by referring to FIGS. 6A to 6D. The pedal force shown in FIG. 6A indicates values detected by the pedal force detection means. FIG. 6B shows the result a differentiation of the pedal force shown in FIG. 6A with respect to time.

Figure 6C:
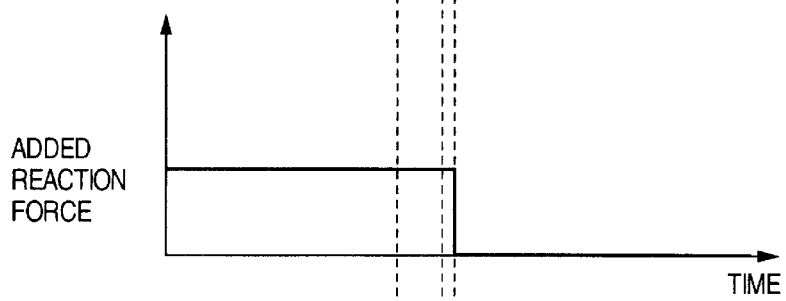
Figure 6D:
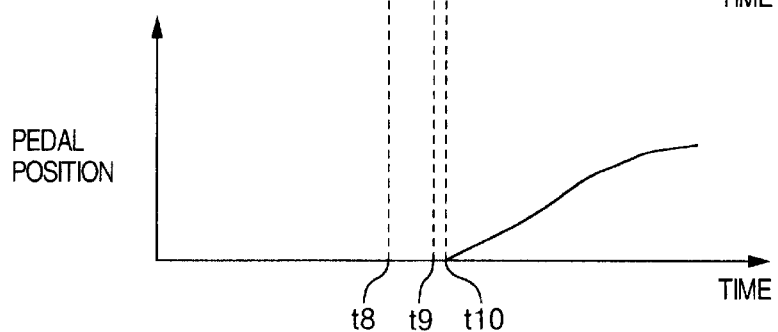

In FIGS. 6A to 6D, until the time t8, the driver simply places his or her foot on the pedal 1. When at the time t8 the driver begins to depress the pedal 1, the pedal force increases as shown in FIG. 6A. At that time, the pedal reaction-force control means 3 monitors a change in the amount of pedal force shown in FIG. 6B and judges whether or not the change in the amount of pedal force has exceeded a prescribed threshold step Sth. If it is supposed that, for example, at the time t9 in FIG. 6B a change in the amount of pedal force has exceeded a prescribed threshold step Sth, the pedal reaction-force control means 3, when this condition continues for a prescribed time, judges that the driver had any intention of operating the pedal 1, for example, at the time t10. Until the time t10, a reaction force is added to the pedal 1 as shown in FIG. 6C.

When it is judged that the driver has any intention of operating the pedal 1, at the step S304 the pedal reaction-force control means 3 performs the adjustment of a reaction force. In other words, as shown in FIG. 6C, the pedal reaction-force control means 3 reduces a reaction force added to the pedal 1. As a result, the pedal apparatus can change the pedal position according to the pedal force.

Incidentally, it is ensured that a reaction force added to the pedal 1 does not change in a case where the amount of change in pedal force instantaneously exceeds a threshold step Sth. Therefore, this permits smooth pedal operation only when the driver required a pedal operation, and on the other hand, when the driver has no intention of operating the pedal 1, the driver can sufficiently place his or her foot on the pedal 1.

Furthermore, the driver's intention of operating the pedal 1 can be judged on the basis of various kinds of vehicle information, such as vehicle speed, vehicle-to-vehicle (adaptive cruise) distance, yaw rate, steering angle, control condition, wiper switch information and brake information, and results of learning by learning means.

On the other hand, when it is judged at the step S302 that the driver has no intention of operating the pedal 1, at the step S305 the pedal reaction-force control means 3 judges whether or not the pedal force F is not less than a prescribed threshold value Fu. In a case where the pedal force F is not less than a prescribed threshold value Fu, at the step S400 the pedal reaction-force control means 3 starts the processing for increasing an initial reaction force. In a case where the pedal force F is less than a prescribed threshold value Fu, the step S305 proceeds to the step S306. On the basis of the output of the pedal reaction-force addition means 4, which has been set, threshold value Fu is set as an upper limit value of the output ratio of the pedal force detection means 2 to the pedal reaction-force addition means 4. In a case where the output of the pedal force detection means 2 is not less than a set threshold value Fu, the pedal reaction-force control means 3 judges that a reaction force added to the pedal 1 is unsuitable for the driver and performs, at the step S400, the processing for increasing an initial reaction force.

The content of the processing for increasing an initial reaction force S400 is described by referring to FIG. 7. The processing for increasing an initial reaction force, the step S400, provides a pedal reaction force suitable for the driver in a case where a set initial reaction force is judged to be too weak for the driver.

At the step S401 in FIG. 7, the pedal reaction-force control means 3 counts, by means of a counter tl, the time during which the condition that the pedal force F is not less than a threshold value Fu is continued. In other words, as shown in FIG. 8B, the pedal reaction-force control means 3 starts counting, if the pedal force exceeds a threshold value at the time t4.

Next, when t1 exceeds a prescribed value T1 at the step S402, at the step S403 the pedal reaction-force control means 3 updates an initial reaction force Fi by the following equation (1) and temporarily finishes this processing. In other words, as shown in FIG. 8B, when a prescribed value T is exceeded at the time t5, the reaction-force control means 3 updates an added reaction force from Fi1 to Fi2. Incidentally, Fnew, which is determined by statistic processing of average values, etc. from a history of pedal force within a prescribed time immediately before the execution of the equation (1), indicates a pedal reaction force necessary for the driver.

$$Fi \leftarrow Fnew \qquad (1)$$

On the other hand, in a case where the pedal force F is not larger than a prescribed threshold value Fu at the step S305 in FIG. 5, at the step S306 the pedal reaction-force control means 3 judges whether or not the pedal force F is less than a prescribed threshold value F1. In a case where the pedal force F is less than F1, at the step S500 the pedal reaction-force control means 3 performs the processing for reducing an initial reaction force. In a case where the pedal force F is not less F1, the step 306 proceeds to the step S307.

On the basis of the output of the pedal reaction-force addition means 4, which has been set, a threshold value F1 is set as a lower-limit value of the output ratio of the foot-power detection means 2 to the pedal reaction-force addition means 4. In a case where the output of the pedal force detection means 2 is less than a set threshold value F1, the pedal reaction-force addition means 3 judges that a reaction force added to the pedal is unsuitable for the driver and performs the processing for reducing an initial reaction force at the step S500.

The content of the processing for reducing an initial reaction force, the step S500, is described by referring to FIG. 9. The processing for reducing an initial reaction force, the step S500, provides a pedal reaction force suitable for the driver by reducing a reaction force added to the pedal in a case where a set initial reaction force is judged to be too strong for the driver.

At the step S501 in FIG. 9, the pedal reaction-force control means 3 counts, by means of a counter t2, the time during which the condition that the pedal force F is not less than a threshold value F1 is continued.

Figure 10B:
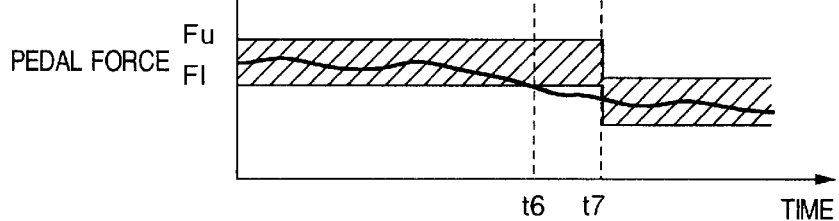

Next, when t2 exceeds a prescribed value T2 at the step S502, at the step S403 the pedal reaction-force control means 3 updates an initial reaction force Fi by the following equation (2) and temporarily finishes this processing. In other words, as shown in FIG. 10B, when a prescribed value T2 is exceeded at the time t6, the reaction-force control means 3 updates an added reaction force from Fi3 to Fi4. Incidentally, Fnew, which is determined by statistic processing of average values, etc. from a history of pedal force within a prescribed time immediately before the execution of the equation (2), indicates a pedal reaction force necessary for the driver.

$$Fi \leftarrow Fnew \qquad (2)$$

As described above, the processing at the steps S400 and S500 enables a pedal reaction force always best suited to the driver to be supplied according to changes in driving environments.

Next, in FIG. 5, after the finish of the steps S304, S400 and S500 and in the case of a negative judgment at the step S306, the pedal reaction-force control means 3 learns, at the step S307, information capable of being obtained from the vehicle and the driver's pedal operation in the driving environment and temporarily finishes this processing.

As described above, according to this embodiment, the pedal reaction-force addition means 4 enables a pedal reaction force always suitable for the driver to be added without being affected by personal differences among drivers and also enables the driver to sufficiently place his or her foot on the pedal 1, thereby making it possible to reduce the driver's physical fatigue during driving. Furthermore, the pedal-status information device enables the driver to have a visual grasp of pedal-holding limits of the pedal reaction-force addition means 4, with the result that it becomes unnecessary for the driver to worry about depressing the pedal when the driver's foot is simply placed on the pedal and that rapid acceleration and rapid braking can be prevented, leading to an improvement in safety and a decrease in the driver's psychological fatigue. Thus, according to this embodiment, it is possible to add an appropriate reaction force to the pedal.

Figure 11:
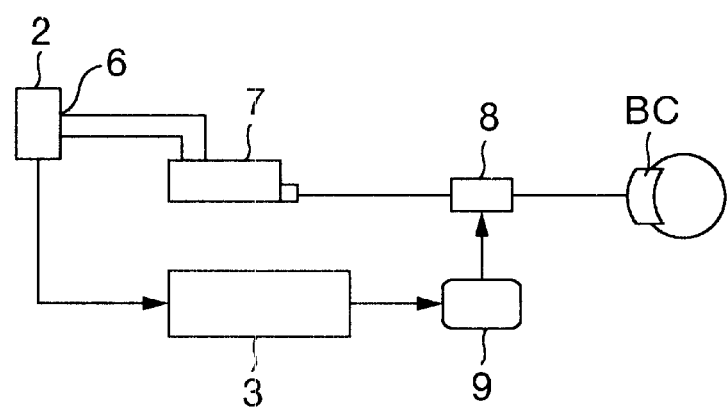
FIG. 11 is a block diagram which shows the arrangement of a pedal apparatus for vehicles comprising a pedal reaction-force application device according to a second embodiment of the present invention.

The arrangement of a pedal apparatus for vehicles according to a second embodiment of the present invention is described by referring to FIG. 11. In this embodiment, the pedal reaction-force addition means is described in a case where it is added to a brake pedal.

FIG. 11 is a block diagram which shows the arrangement of a pedal apparatus for vehicles comprising a pedal reaction-force addition device according to the second embodiment of the present invention. Incidentally, the same numerals as in FIG. 1 indicate the same parts as in FIG. 1.

In this embodiment, the pedal reaction-force addition means comprises a brake pedal 6, a pedal force detection means 2, a pedal reaction-force control means 3, a master cylinder 7, a brake caliper (BC), an on-off valve 8, and an electronic control unit (ECU). The master cylinder 7 works by the operation of the brake pedal 6. The brake caliper (BC) is connected to the master cylinder 7 via a conduit and causes wheels to generate a braking force. The on-off valve 8 allows a hydraulic pressure which is transmitted from the master cylinder 7 to the brake caliper (BC). The electronic control unit (ECU) 9 controls the opening degree of the on-off valve 8 on the basis of the output of the pedal reaction-force control means 3.

In a case where the driver simply places his or her foot on the brake pedal 6 during the operation of an automatic running control apparatus and the output of the pedal force detection means 2, hence the pedal force F is smaller than a reaction force FK, the on-off valve 8 closes so that the output of the master cylinder 7 is not transmitted to the brake caliper (BC). In other words, a braking force is not generated because the brake pedal 6 is not depressed even when the driver places his or her foot on the brake pedal 6. On the other hand, in a case where the pedal force is larger than a reaction force FK, the on-off valve 8 opens and a hydraulic pressure is transmitted to the brake caliper (BC), generating a braking force.

By arranging the pedal reaction-force addition means as mentioned above, according to this embodiment, an appropriate reaction force can be added to the pedal.

Figure 12:
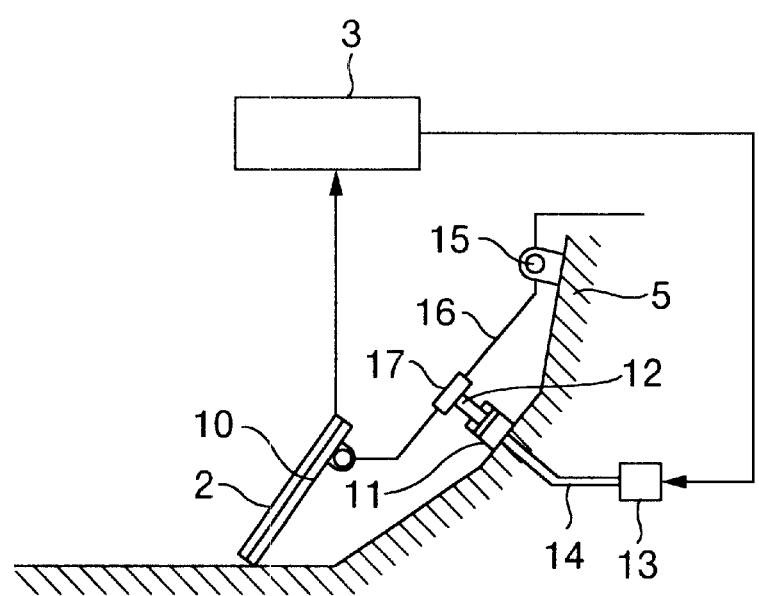
FIG. 12 is a block diagram which shows the arrangement of a pedal apparatus for vehicles comprising a pedal reaction-force application device according to a third embodiment of the present invention.

The arrangement of a pedal apparatus for vehicles according to a second embodiment of the present invention is described by referring to FIG. 12. In this embodiment, the pedal reaction-force addition means is described in a case where it is added to an accelerator pedal.

FIG. 12 is a block diagram which shows the arrangement of a pedal apparatus for vehicles comprising a pedal reaction-force addition device according to the third embodiment of the present invention. Incidentally, the same numerals as in FIG. 1 indicate the same parts as in FIG. 1.

In this embodiment, the pedal reaction-force addition means comprises an accelerator pedal 10, a pedal force detection means 2, a pedal reaction-force control means 3, a cylinder 11, a protrusion 12, a compressor 13, a conduit 14, a support portion 15, a metal fitting 16, and a pressure-receiving portion 17. The protrusion 12 adds a reaction force to the accelerator pedal 10 according to the pressure in the cylinder 11. The compressor 13 adjusts the pressure in the cylinder 11. The conduit 14 connects the cylinder 11 to the compressor 13. The metal fitting 16 is rotatably supported by the support portion 15 and transmits a manipulated variable of the accelerator pedal 10 to the vehicle. The pressure-receiving portion 17 receives the pressure in the cylinder 11 via the protrusion 12 attached to the metal fitting 16.

The compressor 13 adjusts the pressure in the cylinder 11 via the conduit 14 on the basis of the output of the pedal reaction-force control means 3, which is calculated on the basis of the pedal force detection means 2. The protrusion 12 generates a reaction force in the pedal via the pressure-receiving portion 17 according to the pressure in the cylinder 11.

By arranging the pedal reaction-force addition means as mentioned above, according to this embodiment, an appropriate reaction force can be added to the pedal.

The arrangement of a pedal apparatus for vehicles according to a fourth embodiment of the present invention by referring to FIG. 13 to FIGS. 16A to 16D.

Figure 13:
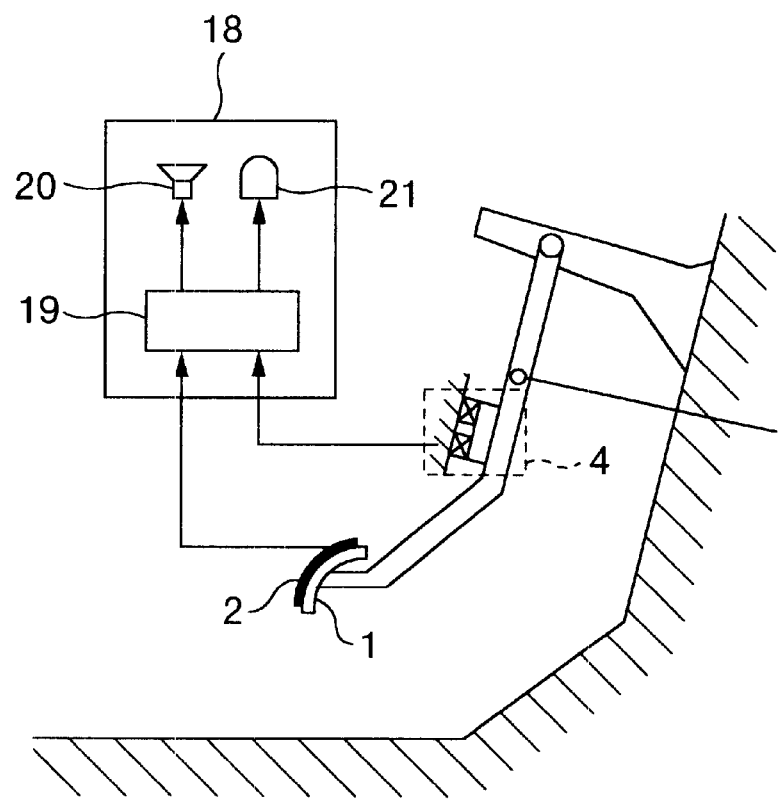
FIG. 13 is a block diagram which shows the arrangement of a pedal apparatus for vehicles comprising a pedal-pedal-status information device according to a fourth embodiment of the present invention.

First, the arrangement of a pedal apparatus for vehicles according to this embodiment of the present invention is described by referring to FIG. 13.

FIG. 13 is a block diagram which shows the arrangement of a pedal apparatus for vehicles comprising a pedal reaction-force addition device according to the fourth embodiment of the present invention. Incidentally, the same numerals as in FIG. 1 indicate the same parts as in FIG. 1.

A pedal-status information device 18, which is used in a vehicle equipped with a pedal 1, a pedal force detection means 2 and a pedal reaction-force addition means 4, comprises a computing means 19, a voice output device 20 and a display means 21. The computing means 19 computes the output of the pedal force detection means 2 and the output of the pedal reaction-force addition means 4. On the basis of results of computation, by use of the voice output device 20 or display means 20, the computing means 19 notifies the driver of the maximum pedal force-which the pedal reaction-force addition means 4 can hold. A concrete example of display means 21 will be described later by referring to FIG. 14.

Figure 14:
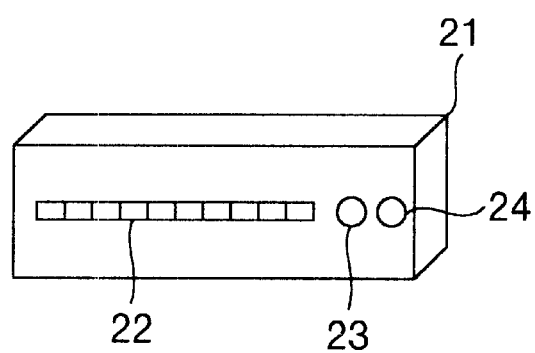
FIG. 14 is a block diagram which shows the arrangement of a display means used in the pedal-pedal-status information device according to the fourth embodiment of the present invention.

The composition of a display means 21 used in the pedal-status information device according to the fourth embodiment of the present invention is described by referring to FIG. 14.

FIG. 14 is a block diagram which shows the arrangement of a display means used in the a pedal-status information device according to the fourth embodiment of the present invention.

The display means 21 comprises a level display portion 22, which is composed of a plurality of LEDs, an alarm display portion 23, and an action display portion 24.

The level display portion 22 computes, by use of a computing means 19, the ratio of the pedal force capable of being held by a pedal reaction-force addition means 4 to the pedal force detected by a pedal force detection means 2, and converts the ratio to the number of LEDs which come on.

As shown in FIG. 14, in a case where the level display portion 22 is composed of ten LEDs, five LEDs come on if the ratio of detected pedal force to the pedal force capable of being held by the pedal reaction-force addition means 4 is 50%.

Figure 15:
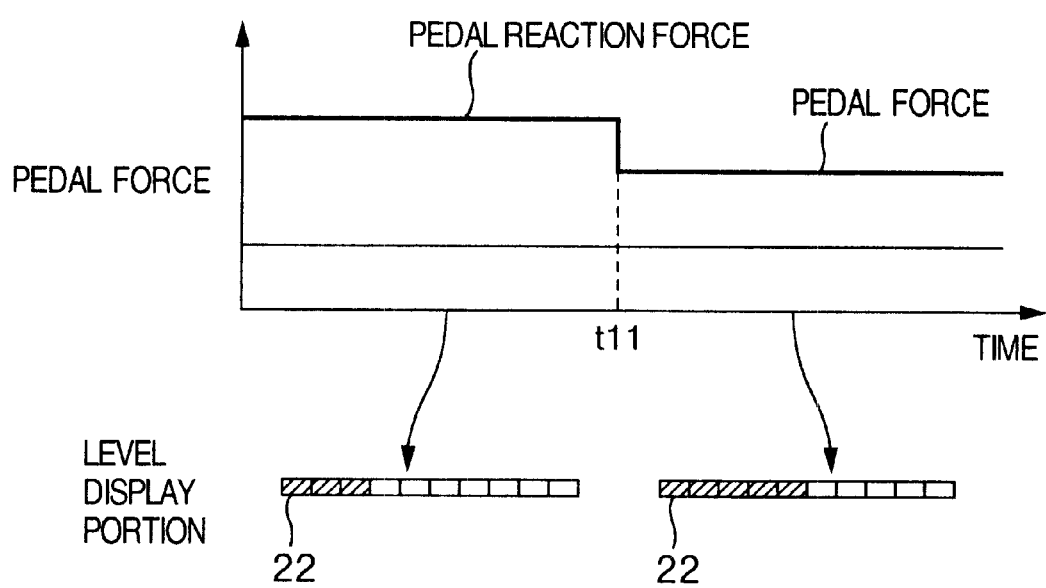
FIG. 15 is an explanatory diagram which shows another example of display means used in the pedal-pedal-status information device according to the fourth embodiment of the present invention.

Another example of display means 21 used in the pedal-status information device according to this embodiment is described by referring to FIG. 15.

FIG. 15 is an explanatory diagram which shows another example of display means used in the pedal-status information device according to the fourth embodiment of the present invention.

As shown in FIG. 15, in a case where the output of the pedal reaction-force addition means 4 is variable, when a set pedal reaction force changed at the time t11, the display of the level display portion 22 is updated even if detected pedal force remains unchanged before and after the time t11.

Next, a display method of the pedal-status information device according to this embodiment is described by referring to FIGS. 16A to 16D.

FIGS. 16A to 16D are time charts which show a display method of the pedal-status information device according to the fourth embodiment of the present invention. In FIGS. 16A to 16D, the horizontal axis represents time. The virtical axis of FIG. 16A represents the magnitude of pedal force, the horizontal axis of FIG. 16B the condition of alarm notice by an alarm display portion 23, and the vertical axis of FIG. 16C the condition of action notice by an action notice portion 24.

In a case where the driver's pedal force detected by a pedal force detection means 2 changed as shown in FIG. 16A, when a prescribed threshold value of which notice is made Ft is exceeded at the time t12, the LEDs of alarm display portion 23 come on as shown in FIG. 16B. Furthermore, when the pedal force is added to the pedal and at the time t13, the pedal force exceeds a limit value Flimit of pedal-holding force as shown in FIG. 16A, the pedal is operated as shown in FIG. 16D and, at the same time, the LEDs of action display portion 24 come on as shown in FIG. 16C. A prescribed threshold value of which notice is made Ft is determined on the basis of a limit value of pedal-holding force Flim at a set pedal reaction force.

The alarm display portion 23 notifies the driver of the fact that when the detected pedal force increases further, that is, when the pedal is further depressed, a limit value of pedal-holding force Flim is exceeded, resulting in the cancellation of pedal holding. Furthermore, the action display portion 24 is for notifying the driver of the fact that pedal holding was cancelled and that a control variable of the pedal is being communicated to the vehicle.

Therefore, from each display portion of the pedal-status information device 21, the driver can easily recognize with what force the pedal is held or with what maximum force the driver's foot can be placed on the pedal. Furthermore, by use of a voice output device 20 or a display means 21, the driver can easily judge to what extent the pedal reaction-force means 4 can hold the pedal force and, therefore, the driver can sufficiently place his or her foot on the pedal and, at the same time, it is unnecessary for the driver to pay attention to the possibility that the pedal may be depressed when the driver's foot is placed on the pedal, thereby making it possible to reduce the driver's psychological fatigue.

Incidentally, the action condition can be notified to the driver also by an alarm sound or a voice by means of the voice output device 20, for example, in addition to the notification by the LEDs of alarm display portion 23 or action display portion 24.

As described above, according to this embodiment, the pedal apparatus is equipped with the action-condition notice means for the driver and, therefore, the pedal apparatus does not put a burden on the driver and is friendly to the driver.

Figure 18:
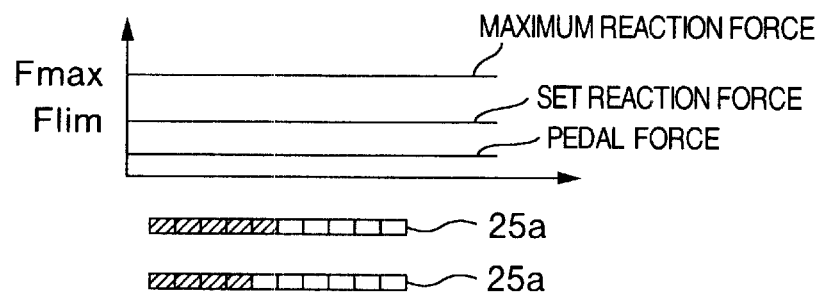
FIG. 18 is an explanatory diagram which shows a further example of display means used in the pedal-pedal-status information device according to the fourth embodiment of the present invention.
Figure 19:
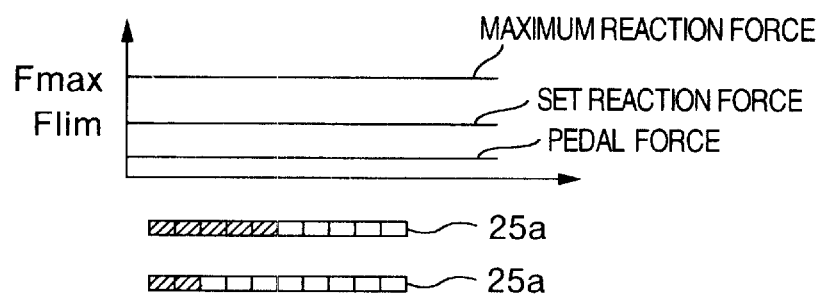
FIG. 19 is an explanatory diagram which shows a further example of display means used in the pedal-pedal-status information device according to the fourth embodiment of the present invention.

Next, other examples of display means used in the pedal-status information device according to this embodiment are described by referring to FIGS. 17 to 19.

FIG. 17 is an explanatory diagram which shows a further example of display means used in the pedal-status information device according to the fourth embodiment of the present invention.

FIGS. 18 and 19 are explanatory diagrams which show other examples of display means used in the pedal-status information device according to the fourth embodiment of the present invention.

A display means 21A shown in FIG. 17 is provided with two level display portions 25a and 25b in addition to an alarm display portion 23 and an action display portion 24.

As shown in FIG. 18, the level display portion 25a displays the ratio of a set pedal reaction force to a maximum value of pedal reaction force capable of being set and the level display portion 25b displays the ratio of the pedal force capable of being held by the pedal reaction-force addition means 4 to the pedal force detected by the pedal force detection means 2, as with the level display portion 22 shown in FIG. 14, whereby it is possible to obtain information on both the set pedal reaction force and the pedal holding limit.

Furthermore, as another display method, as shown in FIG. 19, the level display portion 25a displays the ratio of a set pedal reaction force to a maximum value of pedal reaction force capable of being set and the level display portion 25b displays the ratio of detected pedal force to a maximum value of pedal reaction force capable of being set, whereby it is also possible to compare the set pedal reaction force with the present pedal force by using the maximum value of pedal reaction force capable of being set as a standard.

Set information, results of learning, etc. in each of the above embodiments are recorded in a data recording means (not shown) in the interior of the pedal reaction-force control means 3, and the data recording means constantly retains recorded data. Therefore, each time the driver drives a vehicle, results of learning are added and updated and the data recording means can supply a reaction force of the pedal 1 which is more comfortable to the driver. Furthermore, by installing a plurality of data recording means and also means for selecting data recording means to be used, such as a switch (not shown in the figures), in a case where one vehicle is used by a plurality of drivers, it is possible to perform the adjustment of a reaction force of the pedal 1 by calling data for each driver. Moreover, by installing means for initializing data recording means (not shown in the figures), even in a case where one vehicle is used by an indefinite number of drivers, it is possible to adopt the above method of addition a pedal reaction force.

Still further examples of arrangement of the display means used in the pedal-status information device according to this embodiment are described by referring to FIGS. 20 to 23.

FIGS. 20 to 23 are block diagrams which show still further examples of arrangement of the display means used in the pedal-status information device according to the fourth embodiment of the present invention. Incidentally, the same numerals as in FIG. 14 indicate the same parts as in FIG. 14.

Figure 20:
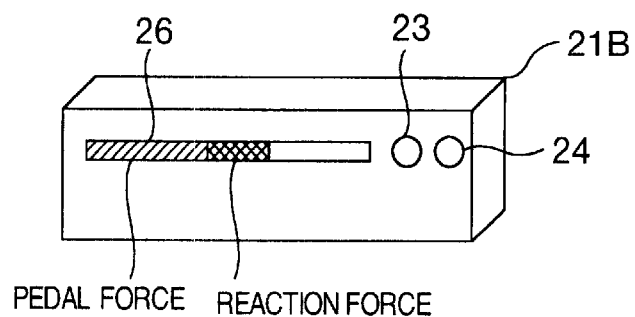
FIG. 20 is a block diagram which shows a still further example of arrangement of the display means used in the pedal -pedal-status information device according to the fourth embodiment of the present invention.
Figure 21:
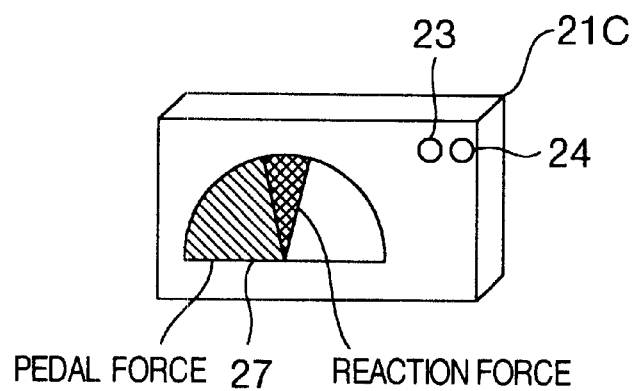
FIG. 21 is a block diagram which shows a still further example of arrangement of the display means used in the pedal-pedal-status information device according to the fourth embodiment of the present invention.
Figure 22:
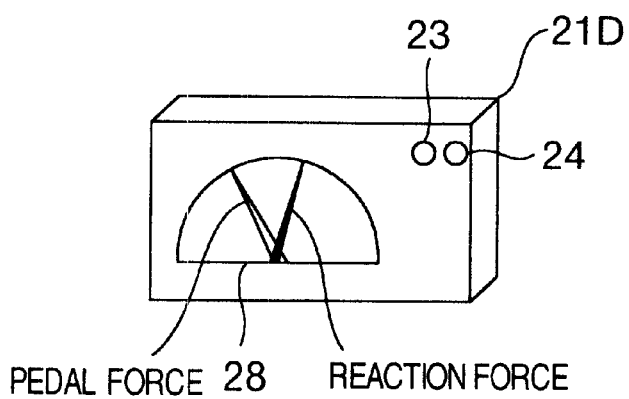
FIG. 22 is a construction diagram which shows a still further example of construction of the display means used in the pedal-status information device according to the fourth embodiment of the invention.
Figure 23:
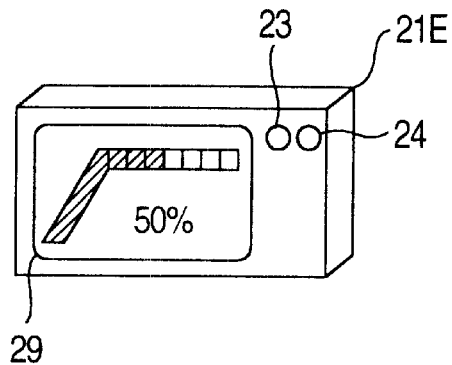
FIG. 23 is a block diagram which shows a still further example of arrangement of the display means used in the pedal-pedal-status information device according to the fourth embodiment of the present invention.

In FIG. 20, a pedal-status information device 21B is provided with a bar display portion 26. In FIG. 21, a pedal-status information device 21C is provided with a semicircular display portion 27. In FIG. 22, a pedal-status information device 21D is provided with a pointer meter 28. In FIG. 23, a pedal-status information device 21E is provided with a display device 29, such as a liquid crystal display.

As described above, according to this embodiment, the pedal apparatus is equipped with the action-information notice means for the driver and, therefore, it does not put a burden on the driver and is friendly to the driver.

Figure 24:
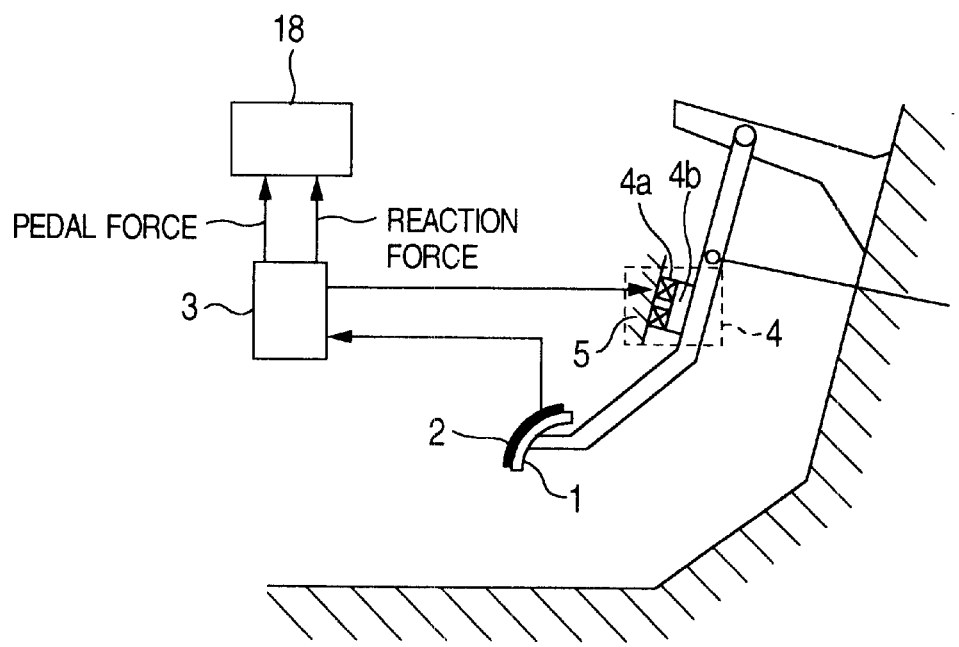
FIG. 24 is a block diagram which shows the arrangement of a pedal apparatus for vehicles according to a fifth embodiment of the present invention.

Next, the composition and operation of a pedal apparatus for vehicles according to the fifth embodiment of the present invention are described by referring to FIG. 24. The pedal apparatus of this embodiment is provided with the pedal reaction-force addition device shown in FIG. 1 and the pedal-status information device shown in FIG. 13.

FIG. 24 is a block diagram which shows the arrangement of a pedal apparatus for vehicles according to the fifth embodiment of the present invention. Incidentally, the same numerals as in FIGS. 1 and 13 indicate the same parts as in FIGS. 1 and 13.

As described in FIGS. 1 to 12, the pedal reaction-force addition means 3 adjusts a reaction force added to the pedal 1 according to the pedal force detected by the pedal force detection means 2. As described in FIGS. 13 to 23, the pedal-status information device 18 notifies the driver of the maximum pedal force which the pedal reaction-force addition means 4 can hold.

By arranging the pedal apparatus in this manner, the operating condition of the pedal reaction-force addition means can be easily ascertained by use of the pedal-status information device and, at the same time, it is possible to supply a condition in which a reaction force added to the pedal is always suited to the driver, with the result that the driver can sufficiently place his or her foot on the pedal and can reduce his or her physical fatigue. At the same time, it is possible for the driver to have a visual grasp of holding limits of the pedal and it is unnecessary for the driver to worry about rapid acceleration, rapid braking, etc., leading to an improvement in safety and a decrease in the driver's psychological fatigue.

As described above, according to this embodiment, by installing the pedal reaction-force addition means, an appropriate reaction force can be added to the pedal. Furthermore, the pedal apparatus is equipped with the action-information notice means for the driver and, therefore, the pedal apparatus does not put a burden on the driver and is friendly to the driver.

Figure 25:
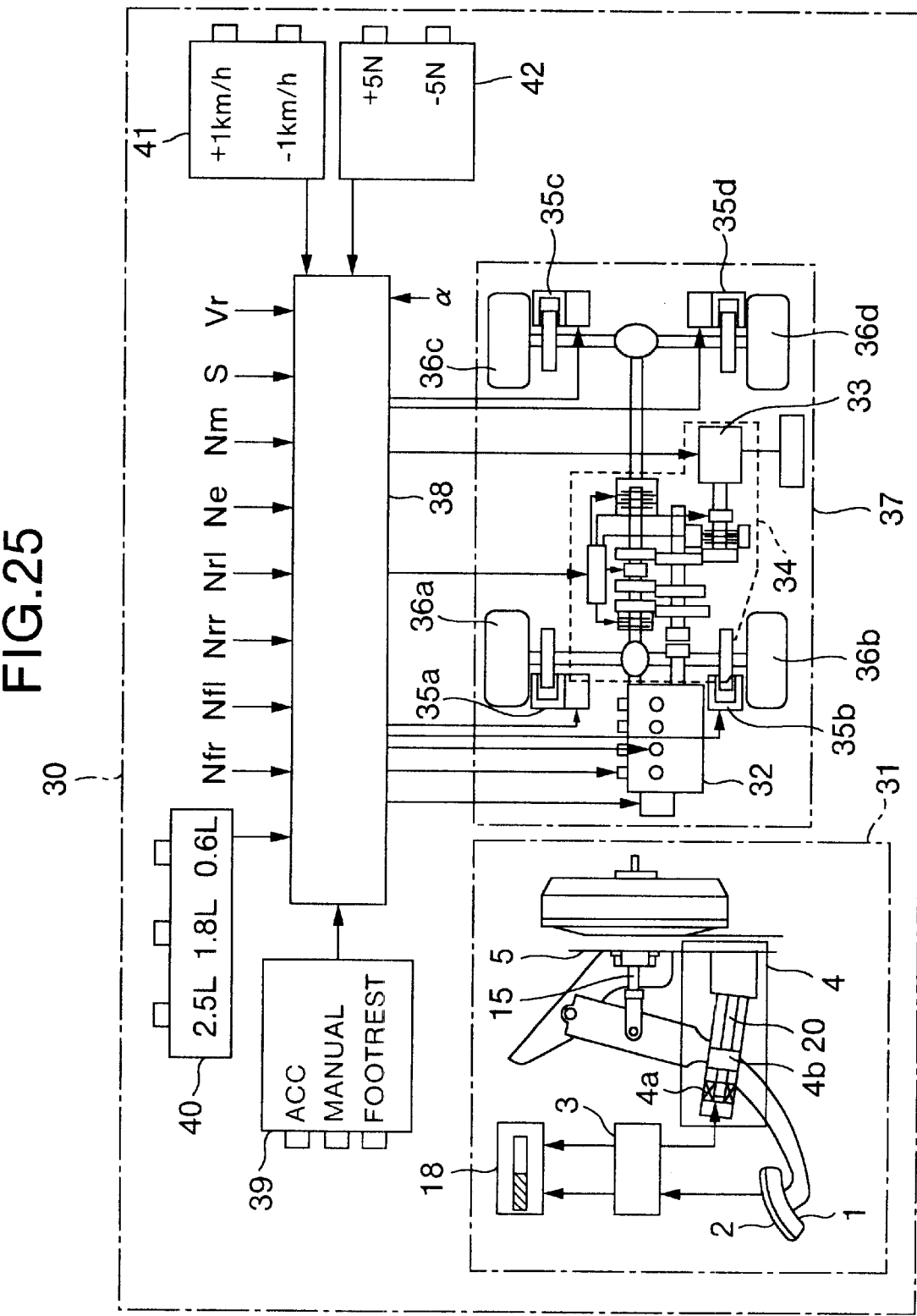
FIG. 25 is a block diagram which shows the arrangement of a vehicle equipped with the pedal apparatus for vehicles according to the fifth embodiment of the present invention.

Next, the arrangement of a vehicle equipped with a pedal apparatus for vehicles according to the fifth embodiment of the present invention is described by referring to FIG. 25.

FIG. 25 is a block diagram which shows the arrangement of a vehicle equipped with the pedal apparatus for vehicles according to the fifth embodiment of the present invention. Incidentally, the same numerals as in FIGS. 1, 13 and 24 indicate the same parts as in these figures.

A vehicle 30 is equipped with a brakeoperating mechanism 31, which comprises a pedal reaction-force addition device composed of the solenoid-type pedal reaction-force addition means 4 described in FIG. 1 and a pedal-status information device 18, a braking and driving system 37, which comprises an engine 32, a transmission 34 including a motor 33, and braking devices 35a to 35d and tires 36a to 36d, and a control system 38 for controlling the braking and driving system 37 in response to input information (which will be described later).

The control system 38 is provided with a control unit for controlling the engine 32, transmission 34, braking device 35, etc. (not shown) and a control unit for controlling the whole braking and driving system 37 (not shown), and each control unit communicates via a network.

Furthermore, the control system 38 receives input information, such as information from the pedal force detection means 2, condition of a running-mode setting switch 39, condition of a driving-force (acceleration) setting switch 40, information from sensors for the manipulated variables of accelerator pedal α, information from a sensor for the rotation of the right front wheel Nfr, information from a sensor for the rotation of the left front wheel Nfl, information from a sensor for the rotation of the right rear wheel Nrr, information from a sensor for the rotation of the left rear wheel Nrl, information on the number of revolutions of the engine Ne, information on the number of revolutions of the motor Nm, distance between the driver's vehicle and the vehicle in front S and relative speed with respective to the vehicle in front Vr, which are obtained from a radar system, etc. not shown in the figure, a speed setting switch 41 by which the driver can set a target speed, and a pedal reaction-force correction switch 42.

On the basis of these input signals, the control system 38 controls the engine 32, transmission 34 and braking device 35 and the acceleration, deceleration, start of running, stop and constant-speed running are performed. During these operations, the reaction force of the pedal is determined by the pedal reaction-force control means 3 on the basis of information from the pedal force detection means 2 and is reflected in the quantity of electricity of a coil 4a of the solenoid-type pedal reaction-force addition means 4. The action of the pedal reaction-force addition means 4 can be set on and off by use of a footrest button of the running-mode setting switch 39.

As described above, in an automobile 30 in which the pedal reaction-force addition means 4 as in this embodiment is used, the driver can control the acceleration and deceleration speeds of the vehicle only by brake operation without moving his or her foot onto the accelerator pedal to depress it, thereby enabling the driver to reduce his or her fatigue during driving. Furthermore, because the driver's foot is constantly placed on the brake pedal, the driver can quickly and strongly depress the brake in an emergency, leading to improved safety.

Incidentally, the present invention is not limited to the above embodiments and can be implemented in various embodiments in which, for example, portions of the invention are combined together, as far as they do not depart from the spirit of the invention. For example, it is possible to install a means for detecting the tension between a body 5 and a stator 4a (not shown) in place of the pedal reaction-force addition means 2 shown in FIG. 1, to install a hydraulic-pressure detection means (not shown) in a conduit that connects a master cylinder 7 and a brake caliper (BC) or in an on-off valve 15 in place of the foot-power detection means 2 shown in FIG. 11, or to install a pressure detection means (not shown) within a cylinder 11 in place of the foot-power detection means 2 shown in FIG. 12.

According to the present invention, an appropriate reaction force can be added to the pedal. Furthermore, it is possible to obtain a pedal apparatus which does not put a burden on the driver and which is friendly to the driver.

What is claimed is:

1. A pedal apparatus for vehicles, comprising:
a pedal reaction-force addition means for adding a reaction force to a pedal of a vehicle for inhibiting operation of the pedal and maintaining the pedal in an initial position;
a pedal force detection means for detecting a force added to the pedal; and
a pedal reaction-force control means for adjusting the reaction force added by said pedal reaction-force addition means, said pedal reaction-force control means adjusting the reaction force by said pedal reaction-force addition means responding to the pedal force detected by said pedal force detection means to maintain the pedal in the initial position.

2. A pedal apparatus for vehicles according to claim 1, wherein, in a case where a prescribed time elapses with a ratio of the force added by said pedal reaction-force addition means to the pedal force detected by said pedal force detection means being kept out of a prescribed range, said pedal reaction-force control means changes the force added by said pedal reaction-force addition means.

3. A pedal apparatus for vehicles according to claim 1, wherein, in a case where the output of said pedal force detection means increases and the amount of increase in the output becomes not less than a prescribed threshold value, the output of said pedal reaction-force addition means is changed.

4. A pedal apparatus for vehicles, comprising:
a pedal reaction-force addition means for adding a reaction force to a pedal of a vehicle;
a pedal force detection means for detecting a force added to the pedal; and
a status information means for giving a driver notice of the status of the force added to the pedal.

5. A pedal apparatus for vehicles according to claim 4, wherein said status information means is a pedal-status information device for giving a notice of an output ratio of said pedal reaction-force addition means to said pedal force detection means.

6. A pedal apparatus for vehicles according to claim 4, wherein, in a case where an output of said pedal force detection means exceeds a prescribed threshold value, said status information means gives a notice of the fact that the output of said pedal force detection means exceeded a prescribed threshold value.

7. A vehicle comprising a pedal apparatus for vehicles, said pedal apparatus for vehicles comprising:
- a pedal reaction-force addition means for adding a reaction force to a pedal of a vehicle when the pedal is in an initial position;
- a pedal force detection means for detecting a force added to the pedal; and
- a pedal reaction-force control means for adjusting the reaction force added by said pedal reaction-force addition means, wherein said pedal reaction-force control means adjusts the reaction force added by said pedal reaction-force addition means responsive to the pedal force detected by said pedal force detection means to maintain the pedal in the initial position.

8. A vehicle comprising a pedal apparatus for vehicles, said pedal apparatus for vehicles comprising:
- a pedal reaction-force addition means for adding a reaction force to a pedal of a vehicle;
- a pedal force detection means for detecting a force added to the pedal; and
- a status information means for giving a driver notice of the status of the force added to the pedal.

* * * * *